United States Patent
Yamanaka

(10) Patent No.: US 6,870,287 B2
(45) Date of Patent: Mar. 22, 2005

(54) COIL WIRING MEMBER FOR MOVABLE MAGNET TYPE LINEAR MOTOR

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 0 days.

(21) Appl. No.: 10/876,646

(22) Filed: Jun. 28, 2004

(65) Prior Publication Data

US 2004/0263001 A1 Dec. 30, 2004

(30) Foreign Application Priority Data

Jun. 26, 2003 (JP) ........................................ 2003-182940

(51) Int. Cl.⁷ .......................... H02K 41/00; H02K 41/02
(52) U.S. Cl. .............................. 310/12; 310/71; 310/14
(58) Field of Search .............................. 310/12, 13, 14, 310/71

(56) References Cited

U.S. PATENT DOCUMENTS 6,787,944 B2 * 9/2004 Finkbeiner et al. ........... 310/12

FOREIGN PATENT DOCUMENTS

JP 07-322595 12/1995
JP 2002-291220 10/2002

* cited by examiner

Primary Examiner—Burton S. Mullins
Assistant Examiner—Heba Y. Elkassabgi
(74) Attorney, Agent, or Firm—Bacon & Thomas

(57) ABSTRACT

It is sought to insulate a stator body and lead lines of coils from one another and provide a coil wiring member for a movable magnet type linear motor, which provides for good operability of interconnecting the lead lines and inexpensive in price.

In a movable magnet type linear motor comprising a stator having coils and a mover mainly having permanent magnets and movable in the longitudinal direction of the stator, a coil wiring member according to the invention is made of a non-conductive material, has a gutter-like shape open at the top and is fitted in a groove formed in the stator body such as to cover the inner groove surfaces.

3 Claims, 7 Drawing Sheets

COIL WIRING MEMBER FOR MOVABLE MAGNET TYPE LINEAR MOTOR

BACKGROUND OF THE INVENTION

1. Field of the Invention

The invention relates to coil wiring members for movable magnet type linear motors.

2. Description of the Prior Art

Linear motors are of various types, and usually of a stationary magnet type with the magnet provided on a stator side and a movable magnet type with the magnet provided on a side of a movable element or a mover side. Japanese Patent Laid Open Publication No. 2002-291220 discloses a movable magnet type linear motor with coils provided on the stator side and a permanent magnet on the mover side. In this movable magnet type linear motor, as shown in FIG. 7(a), a stator 101 is formed by closely arranging a plurality of coils 103 as an axial row around a shaft-like center core 102 (i.e., stator body) of a magnetic material and fitting a pipe 104 on the coils 103. As shown in FIG. 7(b), a movable element or mover 105 is formed by closely arranging a plurality of permanent magnets 106 as an axial row around the pipe 104 and accommodating these permanent magnets 106 in a magnet case 107. With power supplied to the stator side coils 103, the mover 105 is axially moved by the interaction between permanent magnet 106 and the magnetic fluxes from the coils 103.

In the specification of the above Laid Open Publication, it is described that the center core 102 has an axial groove formed in the outer periphery for laying the lead lines of the plurality of coils 103 through the groove.

The technique of forming the stator body with a groove and laying the lead lines of coils through the groove, is also disclosed in Japanese Patent Laid Open Publication No. 7-322595.

In the case with the stator body provided with a groove for wiring as in the above, however, when the lead line insulation film is broken, the lead line may be in contact with the center core as the magnetic substance to result in a short circuit. Therefore, it is necessary to insulate the surface of the center core groove with a surface treatment of insulator coating or the like or by applying an insulation tape. However, the surface treatment such as the insulator coating is very expensive, while with the insulation tape the operability is inferior to reduce the productivity.

Furthermore, in the above well known techniques a plurality of lead lines are laid through a common groove, thus posing a problem that difficulty is encountered in the operation of insulating the lead lines from one another, which adds to the production cost.

The invention has been made for solving the above problem, and it has an object of providing a wiring member for movable magnet type linear motor, which is inexpensively provided for good operability.

SUMMARY OF THE INVENTION

The coil wiring member for movable magnet type linear motor according to the invention is made of a non-conductive material, has a gutter like shape open at the top and is fitted in a groove formed in a stator body such as to cover the inner surfaces of the groove. By using the wiring member, it is thus possible to insulate the stator body groove and the lead lines of coils from one another.

The coil wiring member according to the invention also has integral partition walls formed upright from the inner bottom surface and extending parallel to the two inner surfaces, thus partitioning the space between its two inner surfaces to form a plurality of lead line laying paths. By laying the lead lines each through each lead line laying path, the operation of inter-connecting the lead lines can be readily made to reduce the production cost.

Furthermore, with a lead line laying path change space formed by removing part of the partition walls adjacent to at least one end of the inner bottom surface of the coil wiring member, change of lead line laying paths and inter-connection of lead lines can be made by utilizing this space, and it is thus possible to improve the operability of wiring.

BRIEF DESCRIPTION OF THE DRAWINGS

The invention will become more apparent upon a reading of the following detailed specification with reference to the accompanying drawings, in which.

DESCRIPTION OF THE PREFERRED EMBODIMENTS

Figure 1:
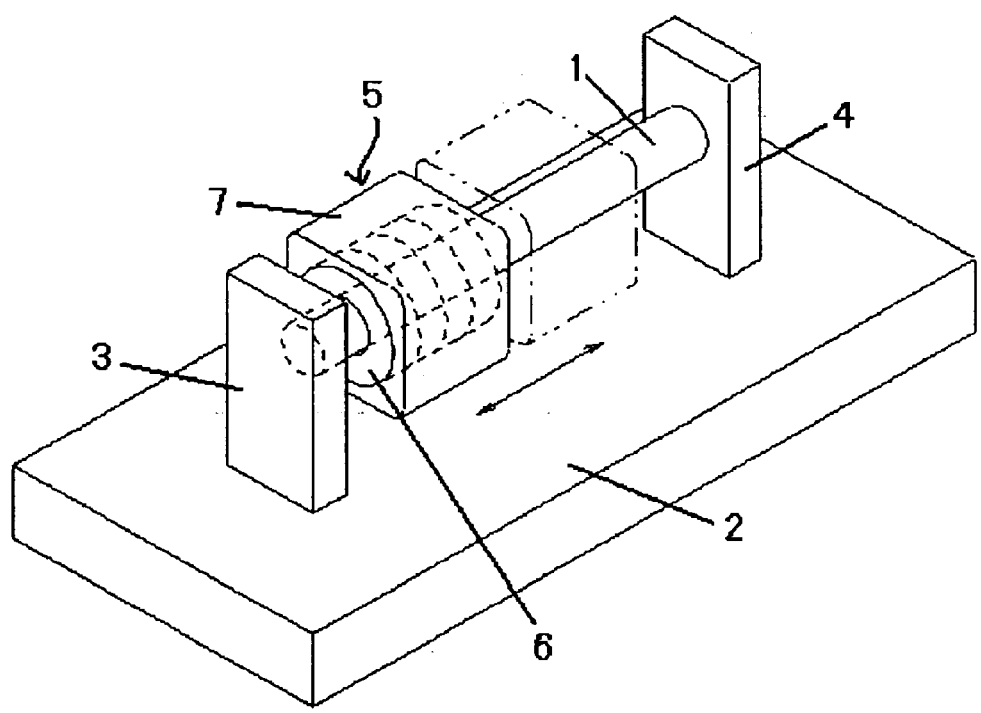
FIG. 1 is a perspective view showing the arrangement of a movable magnet type linear motor.

An embodiment of the invention will now be described with reference to the drawings. FIG. 1 is a perspective view showing the arrangement outline of the movable magnet type linear motor. As shown in FIG. 1, a shaft-like stator 1 has its opposite ends fixedly supported on a left and a right support member 3 and 4 secured to a base 2. The stator 1 penetrates a movable element or mover 5, which is reciprocal in the directions of arrows.

The stator 5 is constituted mainly by a plurality of ring-like permanent magnets 6 penetrated by the stator 1 and a case 7 accommodating a plurality of permanent magnets 6. The plurality of permanent magnets 6 are alike in the diameter and the width and closely juxtaposed in the axial direction of the stator 1.

Although not shown, the mover 5 has a position detecting sensor, and the stator 1 has a power supply cable and a control member for controlling the mover 5, etc.

Figure 2:
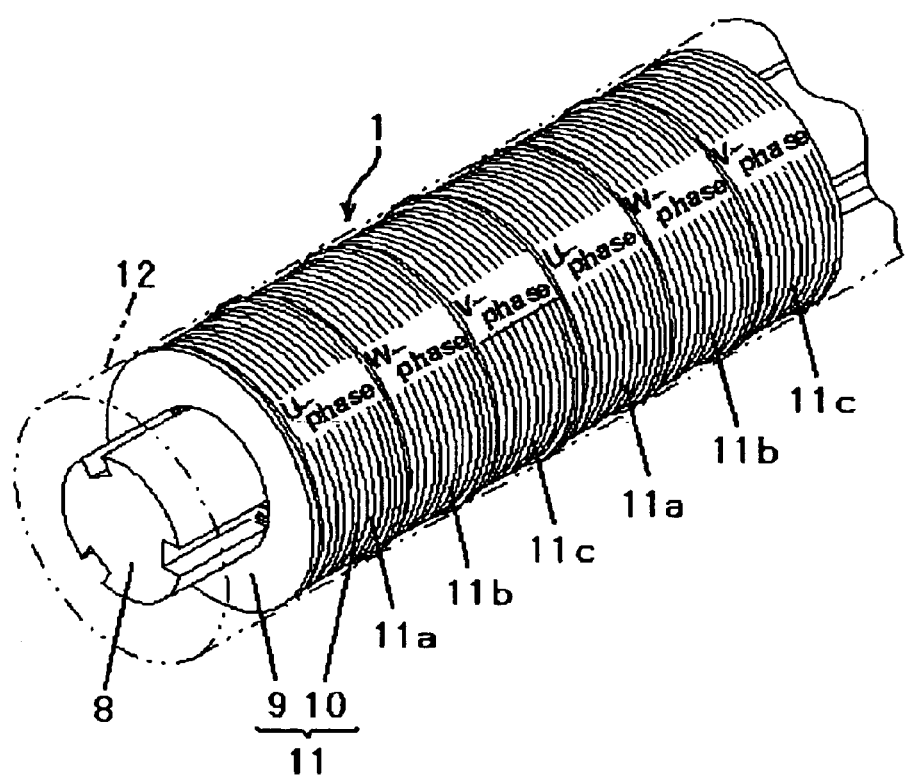
FIG. 2 is a fragmentary perspective view, to an enlarge scale, showing a stator of the linear motor.

As shown in FIG. 2, the stator 1 includes a bobbin 9 disposed around a stator body 8 of a magnetic material such as iron and coils 11 formed by multiple-fold winding lead lines 10 provided with insulating film. This embodiment of the linear motor according to the invention is of the three-phase drive type and thus it has three coils as, namely U-, W- and V-phase coils 11a to 11c, as a set. The W-phase coil 11b has a phase difference of 120 degrees with respect to the U-phase coil 11a, and the V-phase coil 11c also has a phase difference of 120 degrees with respect to the W-phase coil 11b. A plurality of (i.e., two in FIG. 2) coil sets are mounted around the stator body 8 as a row in the axial direction. These coil sets are covered by a pipe 12 of a non-magnetic material (such as stainless steel) as shown by phantom line.

Figure 3:
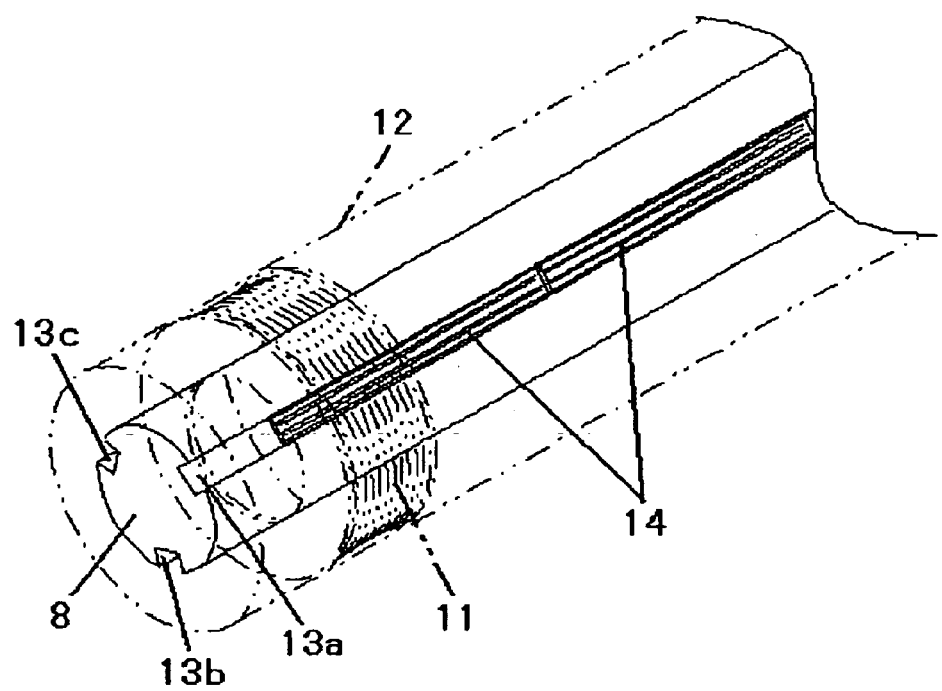
FIG. 3 is a view for describing the state of use of the coil wiring member according to the invention.

As shown in FIG. 3, the stator body 8 has three circumferentially uniformly spaced-apart axial grooves 13a to 13c formed in its outer periphery so as to be provided on and around the stator body 8. The lead line 10 of the U-phase coil 11a is laid through the groove 13a, the lead line 10 of the W-phase coil 11b is laid through the groove 13b, and the lead line 10 of the V-phase coil 11c is laid through the groove 13c. In each of the grooves 13a to 13c, a gutter-like wiring member 14 (see FIG. 4) made of a non-conductive material, such as resin or rubber, is fitted such as to cover the inner surfaces of the groove.

Figure 4:
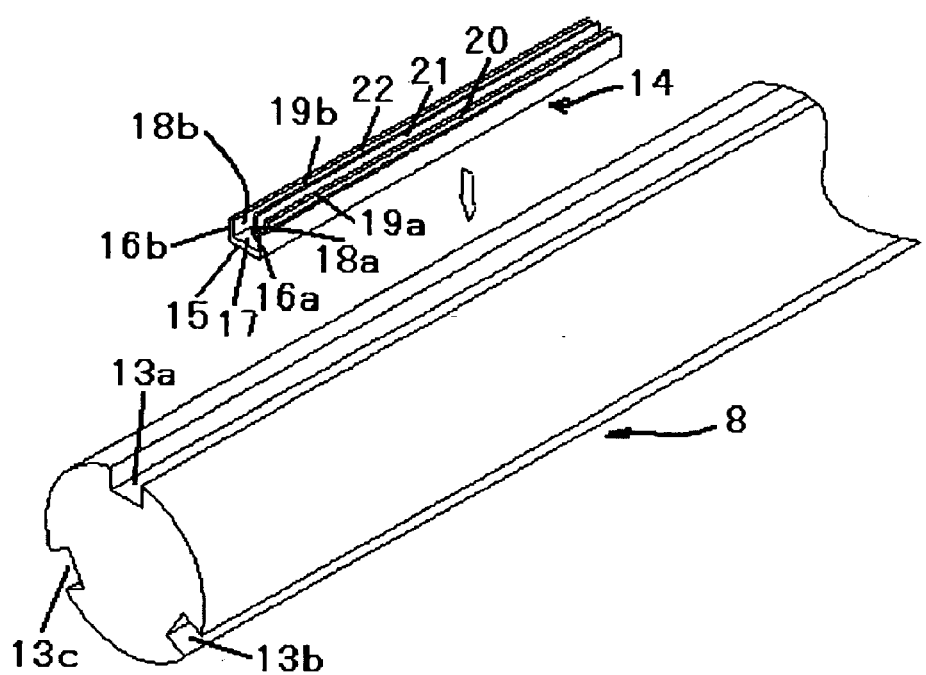
FIG. 4 is an exploded perspective view showing the relation between the coil wiring member and a linear motor stator body to each other.
Figure 5:
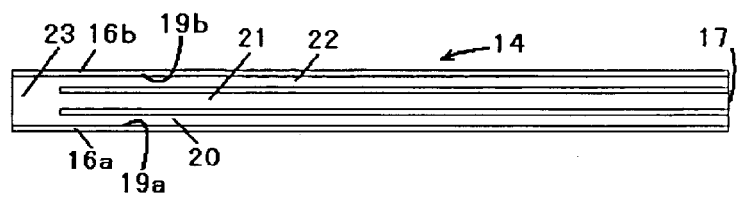
FIG. 5 is a plan view showing the coil wiring member according to the invention.

FIG. 4 is an exploded perspective view showing the coil wiring member 14 according to the invention. FIG. 5 is a plan view showing the coil wiring member 14. The coil wiring member 14 has a flat bottom plate 15 and left and right side walls 16a and 16b. The coil wiring member 14 further has a pair of integral partitioning walls 18a and 18b raised from the inner surface of the bottom plate 15, i.e., inner bottom surface 17. The two partitioning walls 18a and 18b extend parallel to the inner surfaces of the left and right side walls 16a and 16b, i.e., two inner side surfaces 19a and 19b, and define three lead line paying paths (i.e., first to third laying paths 20 to 22) between the two inner side surfaces 19a and 19b.

As shown in FIG. 4, the coil wiring member 14 having the above arrangement is fitted in the groove 13 of the stator body 8 in the direction of arrow to cover the inner surfaces of the groove 13. The height dimension of these coil wiring members 14 is set substantially equal to the depth dimension of the grooves 13, but the coil wiring members 14 may slightly project from the grooves 13. The two partitioning walls 18a and 18b do not reach at the corresponding one end of the bottom plate 15, the area of the corresponding one end of the bottom plate 15 lacks the partitioning walls, so that a lead line laying path change space 23 free from partitioning walls is formed adjacent to one end of the coil wiring member 14. The two partitioning members 18a and 18b extend at the other end up to the corresponding end of the bottom plate 15. It is possible as well to provide the lead line laying path change space 23 adjacent to the other end of the coil wiring member 14.

Figure 6:
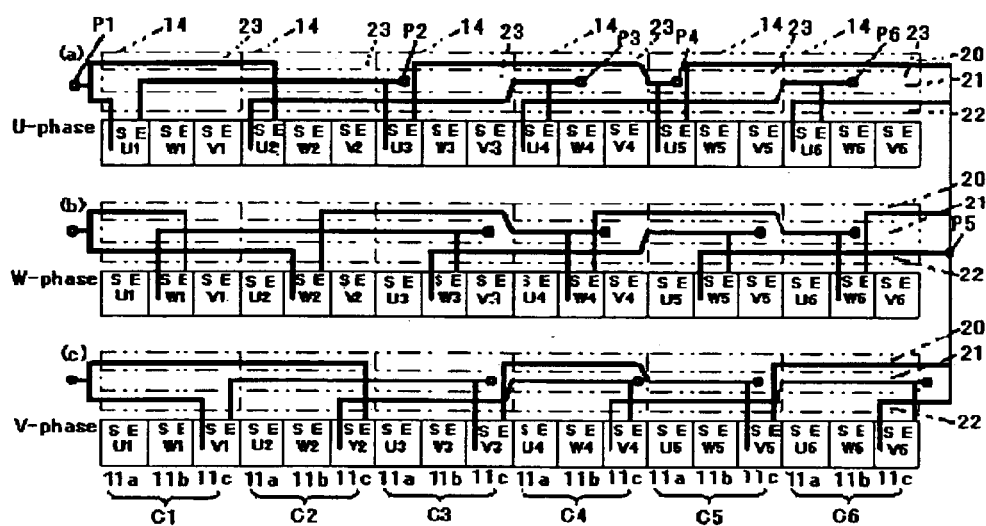
FIGS. 6(a), 6(b) and 6(c) are views showing between the wiring of lead lines of individual phase coils of the linear motor and the lead line laying paths to one another.

FIGS. 6(a) to 6(c) are views showing the wiring of the lead lines 10 of the individual phase coils 11a to 11c and the relation of the coils 11a to 11c and the lead line laying paths (i.e., first to third laying paths 20 to 22) to one another. FIG. 6(a) shows the relation of the U-phase coils 11a and the lead line laying paths (i.e., first to third laying paths 20 to 22). FIG. 6(b) shows the relation of the W-phase coils 11b and the lead line laying paths (i.e., first to third laying paths 20 to 22) to one another. FIG. 6(c) shows the relation of the V-phase coils 11c and the leads line laying paths (i.e., first to third laying paths 20 to 22) to one another. In FIGS. 6(a) to 6(c), reference symbol S designates a leading end or winding start of the lead lines 10 of the coils 11, and reference symbol E designates a trailing end or winding end of the leads 10 of the coils 11.

The length dimension of the coil wiring member 14 as shown by phantom line is set to three times the width of one coil, i.e., set to be equal to the axial dimension of one coil set of the U-, W- and V-phase coils 11a to 11c, and the same number of coil wiring members 14 are used as the number of coil sets. In FIGS. 6(a) to 6(c), the relation of six coil sets (C1 to C7) and six coil wiring members 14 to one another is shown.

The lead lines 10 of the coils 11 are appropriately wired through the lead line laying paths (i.e., first to third laying paths) of the coil wiring members 14. The wiring method is the double star wiring as a usual wiring method. The description of the double star wiring is not given. The coil wiring member according to the invention is not limited to use for the double star wiring, but it is also applicable to other wiring methods such as star wiring and delta wiring.

As shown in FIG. 6(a), the first coil set U-phase coil U1 is wired such that its start S of winding is laid through the third laying path 22 of the first coil wiring member 14 and led leftward in the Figure and that its end E of winding is laid through the second laying path 21 of the first coil wiring member 14 and led rightward in the Figure. Likewise, the second coil set U-phase coil U2 has its start of winding laid through the third laying path 22 of the second coil wiring member 14 and led rightward in the Figure. The first coil set U-phase coil U1 also has its end E of winding laid through the first laying path 20 of the second coil wiring member 14 and led leftward in the Figure. The second coil set U-phase coil U2 also has its end E of winding laid through the first laying paths 20 of the second and first coil wiring members 14 and the start S of winding of the first coil set U-phase coil U1 at point P1 of connection, which is provided as a terminal outside the coil wiring member 14 and connected to a control member (not shown).

The third coil set U-phase coil U3 has its start of winding laid through the second laying path 21 of the third coil wiring member 14 and led rightward in the Figure, and is connected to the end E of winding of the first coil set U-phase coil U1 laid through the second laying paths 21 of the first to third coil wiring members 14 at point P2 provided in the second laying path 21 of the third coil wiring member 14. The third coil set U-phase coil U3 is laid through the first laying path 20 of the third coil wiring member 14 and led rightward in the Figure.

The fourth coil set U-phase coil U4 has its start S of winding laid through the third laying path 22 of the fourth coil wiring member 14 and led rightward in the Figure. The fourth coil set U-phase coil U4 also has its end E of winding is laid through the second laying path 21 of the fourth coil wiring member 14, led rightward in the Figure, then laid through the third laying paths 22 of the second and third coil wiring members 14, then brought to a laying path change in the laying path changing space 23 in the third coil wiring member 14, and then connected to the start S of winding of the second coil set U-phase coil U2 laid through the second laying path 21 of the fourth coil wiring member 14 at point P3 in the second laying path 21 of the fourth coil wiring member 14.

The fifth coil set U-phase coil U5 has its start S of winding lead through the second laying path 21 of the fifth coil wiring member 14, led rightward in the Figure, then laid through the first laying paths 20 of the third and fourth coil wiring members 14, then brought to a laying path change in the laying path changing space 23 in the fourth coil wiring member 14, and wired to the end E of winding of the third coil set U-phase coil U3 laid through the second laying path 21 of the fifth coil wiring member 14 at point P4 in the second laying path 21 of the fifth coil wiring member 14. The fifth coil set U-phase coil U5 has its end E of winding laid through the first laying path 20 of the fifth coil wiring member 14 and led rightward in the Figure.

The sixth coil set U-phase coil U6 has its start S of winding laid through the third laying path 22 of the sixth coil wiring of member 14, led rightward in the Figure, and then commonly connected at point P5 together with the end E of winding of the fifth coil set U-phase coil U5. The sixth coil set U-phase coil U6 also has its end E of winding laid through the second laying path 21 of the sixth coil wiring member 14, led rightward in the Figure, then laid through the third laying paths 22 of the fourth and sixth coil wiring members 14, then brought to a laying path change in the laying path changing space 23 of the fifth coil wiring member 14, and then connected to the start S of winding of the fourth coil set U-phase coil U4 laid through the second laying path 21 of the sixth coil wiring member 14 at point P6 in the second laying path 21 of the sixth coil wiring member 14.

Figure 7:
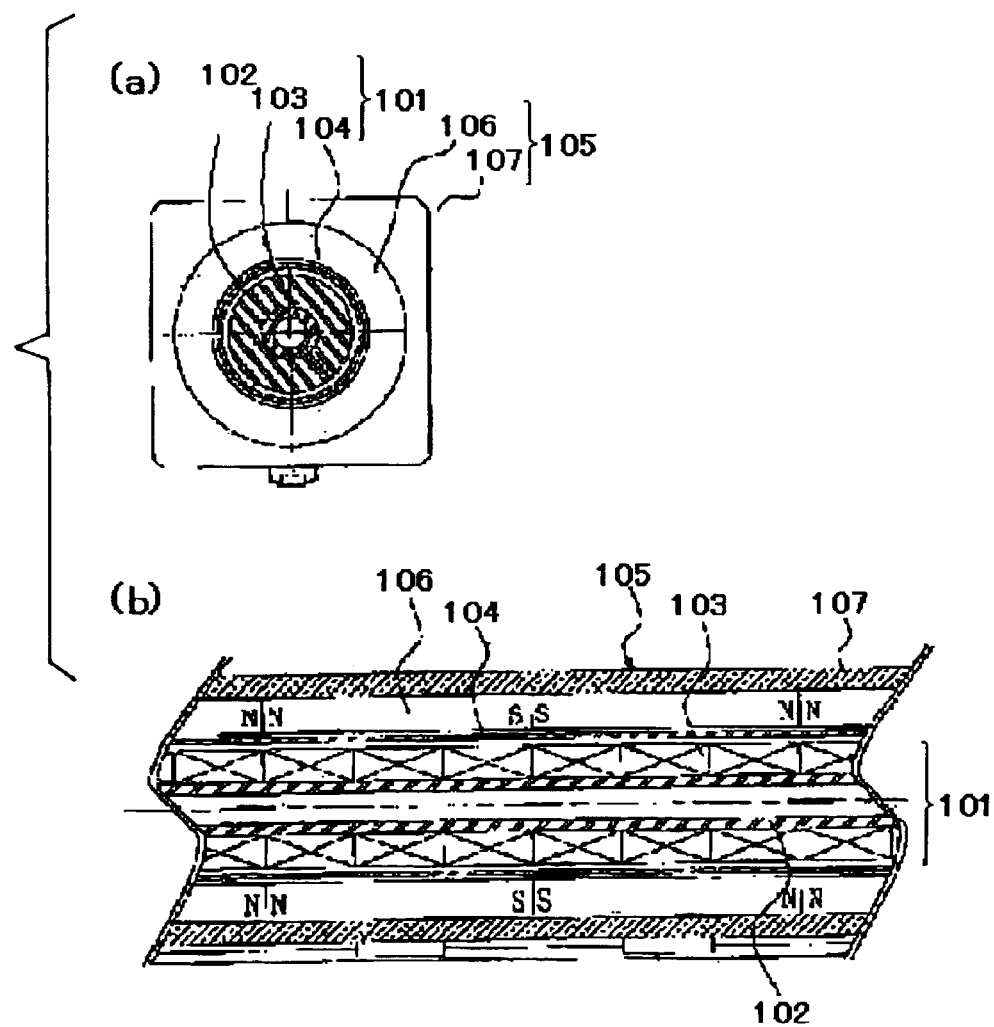
FIGS. 7(a) and 7(b) are views of the arrangement of a prior art movable magnet type linear motor.

The relation between the W-phase coil 11b and the lead line laying paths (i.e., first to third laying paths 20 to 22), as shown in FIG. 6(b), and the relation between the V-phase coil 11c and the lead line laying paths (i.e., first to third laying paths 20 to 22), as shown in FIG. 7(a), are like the FIG. 6(a) case and are not described.

The coil wiring member 14 according to the invention is not limited in use to the three-phase drive linear motor as described in the above embodiment. Also, the shape of the stator body is not limited to the shaft-like one but it is possible to obtain the same effects with the flat shape.

As has been described in the foregoing, the coil wiring member for movable magnet type linear motor according to the invention is made of a non-conductive material, and has a gutter-like shape open at the top. By fitting the coil wiring member in a groove of the stator body such as to cover the inner surfaces of the groove, it is possible to readily and inexpensively insulate the stator body and lead lines of coils from one another.

Particularly, with the arrangement that integral partition walls are provided such as to be erected upright from the inner bottom surface of the groove and extend parallel with the two inner side wall surfaces so as to define a plurality of lead line laying paths between the two inner side wall surfaces, it is possible to lay lead lines one by one in each lead line laying path. Thus, it is possible to permit ready operation of interconnecting the lead lines and reduce the production cost.

Furthermore, by forming the lead line laying path changing space free from partition walls adjacent to at least one end of the inner bottom surface of the coil wiring member, a lead line laying path change and interconnection of the lead lines can be made by utilizing the space, thus improving the operability of the wiring.

What is claimed is:

1. In a movable magnet type linear motor comprising a stator including a conductive stator body (8) having a plurality of linear grooves (13a to 13c) and a plurality of coils (11) provided on and around the stator body to extend in the longitudinal direction of the grooves such that the lead lines (10) of the coils are laid through and interconnected in the grooves, and a mover (5) mainly including a plurality of permanent magnets (6) arranged to face the coils and movable in the longitudinal direction of the grooves, a coil wiring member for the movable magnet type linear motor, said coil wiring member being made of a non-conductive material, having a gutter-like shape open at the top and fitted in said groove such as to cover the inner surface of the groove.

2. The coil wiring member for movable magnet type linear motor according to claim 1, comprising an inner bottom surface (17), and a plurality of integral partitioning walls (18a and 18b) integrally formed with said inner bottom surface and extending parallel with the two inner side wall surfaces (19a and 19b) to define a plurality of lead line laying paths (20 to 22) between the two inner side wall surfaces (19a and 19b).

3. The coil wiring member for movable magnet type linear motor according to claim 2, wherein a lead line laying path changing space (23) free from partitioning walls is formed adjacent at least one end of the inner bottom surface.

* * * * *